(12) United States Patent
Shelby

(10) Patent No.: US 8,195,814 B2
(45) Date of Patent: Jun. 5, 2012

(54) METHOD AND APPARATUS FOR VIRTUALIZING RESOURCES

(75) Inventor: Zachary Shelby, Sotkamo (FI)

(73) Assignee: Sensinode Oy, Oulu (FI)

( * ) Notice: Subject to any disclaimer, the term of this patent is extended or adjusted under 35 U.S.C. 154(b) by 308 days.

(21) Appl. No.: 12/617,836

(22) Filed: Nov. 13, 2009

(65) Prior Publication Data

US 2010/0125641 A1 May 20, 2010

(30) Foreign Application Priority Data

Nov. 17, 2008 (FI) .................................... 20086085

(51) Int. Cl.
*G06F 15/16* (2006.01)
(52) U.S. Cl. .................... 709/228; 709/230; 709/232
(58) Field of Classification Search .................. 709/206, 709/228, 230, 232
See application file for complete search history.

(56) References Cited

U.S. PATENT DOCUMENTS

| | | | | |
|---|---|---|---|---|
| 2003/0112231 A1* | 6/2003 | Kurumisawa | .................. | 345/212 |
| 2003/0112232 A1 | 6/2003 | Georgalas | | |
| 2004/0054690 A1* | 3/2004 | Hillerbrand et al. | ....... | 707/104.1 |
| 2006/0106933 A1 | 5/2006 | Huang et al. | | |
| 2007/0143664 A1* | 6/2007 | Fang et al. | .................... | 715/513 |
| 2007/0149189 A1 | 6/2007 | Yang et al. | | |
| 2007/0210916 A1* | 9/2007 | Ogushi et al. | .................. | 340/531 |
| 2008/0208367 A1* | 8/2008 | Koehler et al. | .................. | 700/19 |

FOREIGN PATENT DOCUMENTS

| | | |
|---|---|---|
| EP | 1 130 875 | 9/2001 |
| EP | 1 441 483 | 7/2004 |
| WO | 2005/107408 | 11/2005 |
| WO | 2005/125149 | 12/2005 |

OTHER PUBLICATIONS

Written Opinion of the International Preliminary Examining Authority for International Patent Application No. PCT/FI2009/050917 mailed Nov. 4, 2010.
Official Action and Search Report issued in Finnish Priority Application No. 20086085, 2009.
Shuermann, V. et al.: "XML-based Middleware Approach for Industrial Wireless Communication Systems", IEEE International Conference on Emerging Technologies and Factory Automation, 2008. ETFA 2008, Sep. 15, 2008, IEEE, Piscataway, NJ, USA, pp. 632-639, paragraph 4.3.
Delicato F. et al: "A Flexible Web Service based Architecture for Wireless Sensor Networks" Proceedings of the 23'd International Conference on Distributed Computing Systems Workshops, 2003 IEEE, Computer Society, 6 pages.
Reed C. et al.: "OGC(R) Sensor Web Enablement: Overview and High Level Architecture", Autotestcon, 2007, IEEE, Sep. 1, 2007, pp. 372-380.

(Continued)

*Primary Examiner* — Brian J Gillis
(74) *Attorney, Agent, or Firm* — Barnes & Thornburg LLP

(57) ABSTRACT

The invention relates to an apparatus and a method for virtualizing resources. The apparatus is configured to store resource descriptions of a number of resources operatively connected to the apparatus, the resource descriptions including resource identification information, generate and store alternative descriptions of received resource descriptions by changing at least part of the identification information of the descriptions, publish at least some of the resource descriptions in a network, and handle resource data requests from the network relating to the resources.

28 Claims, 7 Drawing Sheets

OTHER PUBLICATIONS

Kawahara, Y. et al.: "Designing a Framework for Scalable Coordination of Wireless Sensor Networks, Context Information and Web Services", 7th International Conference on Distributed Computing Systems Workshops, 2007. ICDCSW'07, IEEE, Pi, Jun. 1, 2007, 5 pages.

Meshkova, E. et al.: "A survey on resource discovery mechanisms, peer-to-peer and set-vice discovery frameworks", Computer Networks, 20080808, vol. 52, Elsevier Science Publishers B.V., Amsterdam, NL, pp. 2097-2128.

Savio D. et al.: "Web-Service Enabled Wireless Sensors in SOA Environments", IEEE International Conference on Emerging Technologies and Factory Automation, 2008. ETFA 2008, IEEE, Piscataway, NJ, USA, pp. 952-958.

International Search Report for International Application No. PCT/FI2009/050917, dated Feb. 3, 2010.

* cited by examiner

METHOD AND APPARATUS FOR VIRTUALIZING RESOURCES

CROSS-REFERENCE TO RELATED APPLICATIONS

The present application claims the benefit of priority to Finland Patent Application No. 20086085 filed 17 Nov. 2008, the contents of which are incorporated herein by reference in their entirety.

FIELD

The invention relates to a method and an apparatus for virtualizing resources. In particular, the invention relates to virtualizing resources in embedded computer networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

The use of sensor networks in buildings and other environments has increased in recent years. Sensors may be used to measure different physical parameters such as temperature, humidity, sound and movement, for example. Information gathered from the sensors may be used in various applications, such as home automation or environment monitoring for security or other purposes. The sensor networks may be wired or wireless. The wireless approach to sensor networks has gained interest lately with the development of wireless low power communication techniques.

Low-power wireless networks, such as IEEE 802.15.4 based embedded and sensor networks, are very energy efficient, and the chip technology is cheap. For this reason the technology is making its way to embedded devices very quickly for automation, measurement, tracking and control, for example. However, these networks have very limited resources for transmitting information.

Currently application protocols for IP-based low-power wireless networks are designed and implemented in a customary way with each application designer making a byte format of their own, usually useable only within that network. Thus, connecting a wireless sensor network through a device acting as a router to a local or remote application using the sensor network is a very proprietary setup. Each sensor network is treated as a separate domain. An application-specific local solution is always required for using the network. At present, an application requesting to use such sensor networks has to support each kind of network separately. Each network may have its own resource discovery and data communication technique, which may even be application or vendor specific.

In addition, several different communication techniques are in use, such as IEEE 802.15.4-based solutions or Bluetooth Ultra Low Power (ULP) solutions. These solutions are incompatible with each other. Therefore, a mobile device trying to access a local wireless sensor network may be faced with an incompatible wireless technology. Although accessing the local resource through the Internet is sometimes a solution, it is not always practical or even possible. This is a very cumbersome situation especially if the intention is to make the use of sensor networks accessible to mobile devices on a large scale.

BRIEF DESCRIPTION

An object of the invention is to provide an improved solution for accessing the resources of wireless sensor networks.

According to an aspect of the present invention, there is provided an apparatus, configured to store resource descriptions of a number of resources operatively connected to the apparatus, the resource descriptions comprising resource identification information, generate and store alternative descriptions of received resource descriptions by changing at least part of the identification information of the descriptions, publish at least some of the resource descriptions in a network, and handle resource data requests from the network relating to the resources.

According to another aspect of the present invention, there is provided a method for virtualizing resources, comprising storing resource descriptions of a number of resources comprising resource identification information, generating and storing alternative descriptions of received resource descriptions by changing at least part of the identification information of the descriptions, publishing at least some of the resource descriptions in a network, and handling resource data requests from the network relating to the resources.

According to another aspect of the present invention, there is provided an apparatus, comprising: means for storing resource descriptions of a number of resources operatively connected to the apparatus, the resource descriptions comprising resource identification information, means for generating and storing alternative descriptions of received resource descriptions by changing at least part of the identification information of the descriptions, means for publishing at least some of the resource descriptions in a network, and means for handling resource data requests from the network relating to the resources.

Embodiments of the invention provide several advantages. The embodiments make resource discovery scalable and universal. In addition, multiple wireless sensor networks may be seamlessly integrated with local and Internet context services. Furthermore, embodiments of the invention allow a universal messaging system to be used on low-power wireless networks where up until now, mostly proprietary application-specific protocols have been used.

Embodiments of the invention may be utilized in connection with networks comprising sensors, actuators or embedded devices in general.

LIST OF DRAWINGS

Embodiments of the present invention are described below, by way of example only, with reference to the accompanying drawings, in which FIG. 1 illustrates an example of a network to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
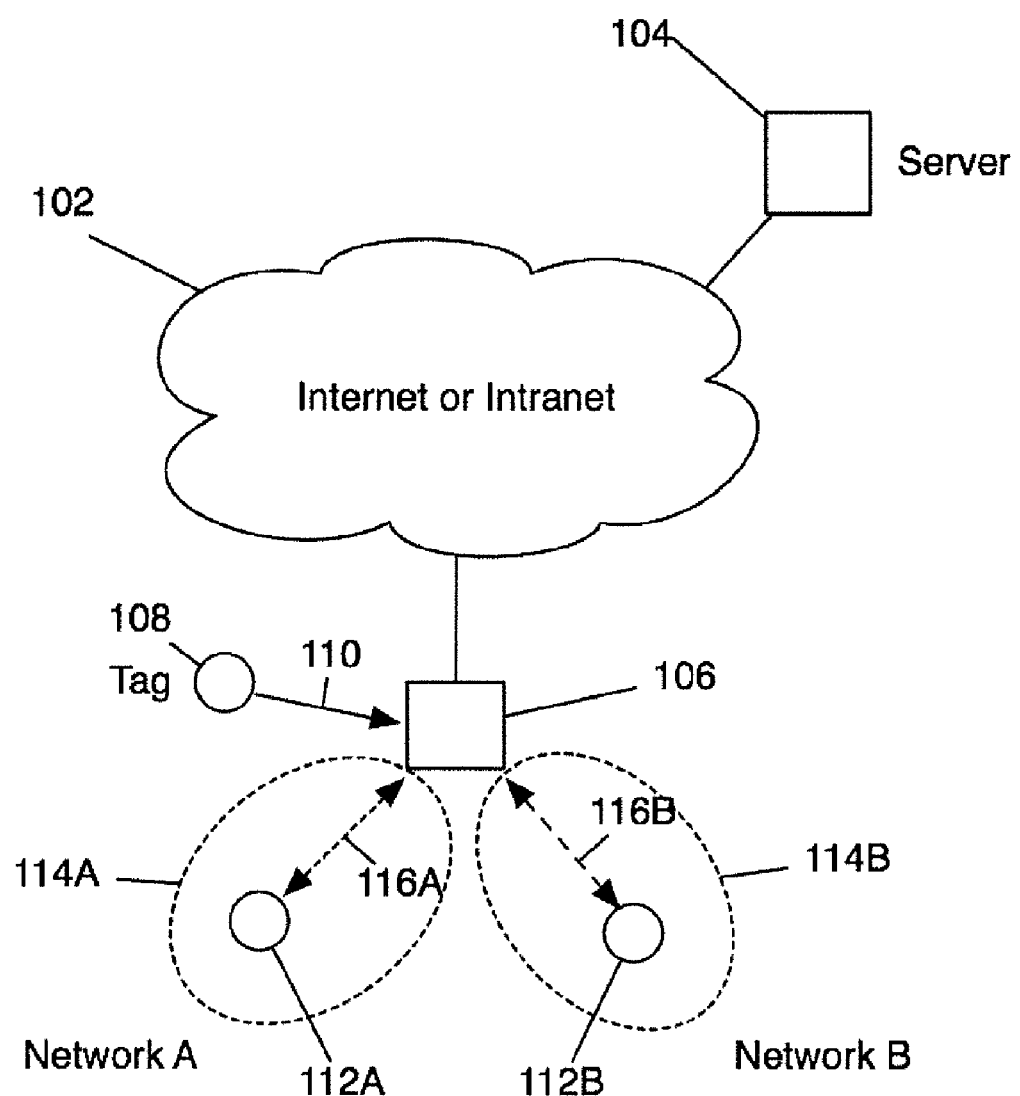

FIG. 1 illustrates an example of a network topology to which embodiments of the invention may be applied. The exemplary network topology of FIG. 1 comprises two wireless sensor networks 114A, 114B connected to a router or an intermediate node 106. The low-power wireless networks may be connected to the Internet/Intranet and IP-based network via the intermediate node 106, which is physically either a wireless router between the low-power wireless network and the Internet/Intranet or an edge server located in the IP network or other network unit connected to the network. The connection to the Internet/Intranet may be wired or wireless.

The wireless sensor networks 114A, 114B comprise radio interfaces 116A, 116B, respectively. The radio interfaces may be realized using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low power transmission. IEEE stands for Institute of Electrical and Electronics Engineers. The radio interfaces 116A, 116B may be incompatible with each other.

In the example of FIG. 1, both wireless sensor networks 114A, 114B comprise a single node 112A, 112B for the sake of simplicity. In reality, many sensor networks comprise several nodes. The network may be a multihop network of nodes where each node does not have a direct connection to the router 106 but is connected to the router via another node of the network.

The nodes 112A, 112B in the networks provide data for use by some server or application. The data may be temperature, humidity, sound or movement sensor data, for example. The interface the sensor nodes provide for accessing the sensor data is called a resource. A resource could also be a management or a control interface to a node.

In addition, the nodes may be actuators, such as controllable light emitting diode (LEDs), servos, motors or general embedded devices. In following, the term "sensor network" is used but the term "embedded network" or "sensor and actuator network" could be used as well, as one skilled in the art is aware.

FIG. 1 shows a server 104 on the Internet which may utilize the resources of the wireless sensor networks. Each resource of a sensor network is described by a resource description. The resource descriptions are available from the nodes themselves, or from some external source, like a radio frequency identification (RFID) tag 108 operatively connected 110 to the router.

Connections between the router 106 to the Internet/Intranet and to the server 104 are IP-based connections. Typically in the Internet environment, resources may be described using a Internet resource description language such as Resource Description Framework (RDF) or Atom. Both of these example languages are Extensible Markup Language (XML) based languages. XML can be used to represent any kind of information. XML-based messages are made up of structured XML tags.

In following, RDF is used as an example of Internet resource description languages. However, it should be noted that any other language may be utilized as well and that the embodiments of the invention are not limited to RDF or any particular language or protocol, as one skilled in the art is aware.

The resource descriptions may be transmitted in the Internet using different protocols. When RDF messages are transmitted over the Internet, they use an application protocol such as HTTP over TCP/IP or Session Initiation Protocol (SIP) over TCP/IP. In addition, SOAP (Simple Object Access Protocol) may be used. SOAP is an Internet service messaging protocol which is widely used in the transmission of automated messages between computer servers in the Internet. SOAP provides an extensible format for providing message exchanges between computers to achieve any given task. At present, the content of a SOAP message is encoded using Extensible Markup Language (XML).

However, using XML based RDF with HTTP or SIP over TCP/IP is a very inefficient and heavy solution for low power networks having very limited data transmission capabilities.

In an embodiment, the intermediate unit, the network unit or the router 106 may compress the XML-based protocols into a binary format protocol comprising the same message elements in a binary format. The binary format protocol is very efficient and suitable for low power sensor networks retaining all message information of the XML-based protocols. Respectively, the router 106 may decompress binary format messages into XML-based protocols. Thus, the router or the intermediate node 106 may transmit resource descriptions and advertisements in the Internet/Intranet using XML-based description language such as RDF and resource data requests and responses may be transmitted using SOAP, SIP, HTTP or any other suitable protocol. However, connections between the router or the intermediate node 106 and sensor nodes are realized with binary versions of the above mentioned protocols. The binary encoded messaging carries all the functionality of the XML-based messaging but requires only a very small transmission capacity, thus making it suitable for low-power and low-capacity networks. In an embodiment, the compression and decompression between XML and binary formats is performed in the router or intermediate node 106. These conversions will be described later.

Figure 2:
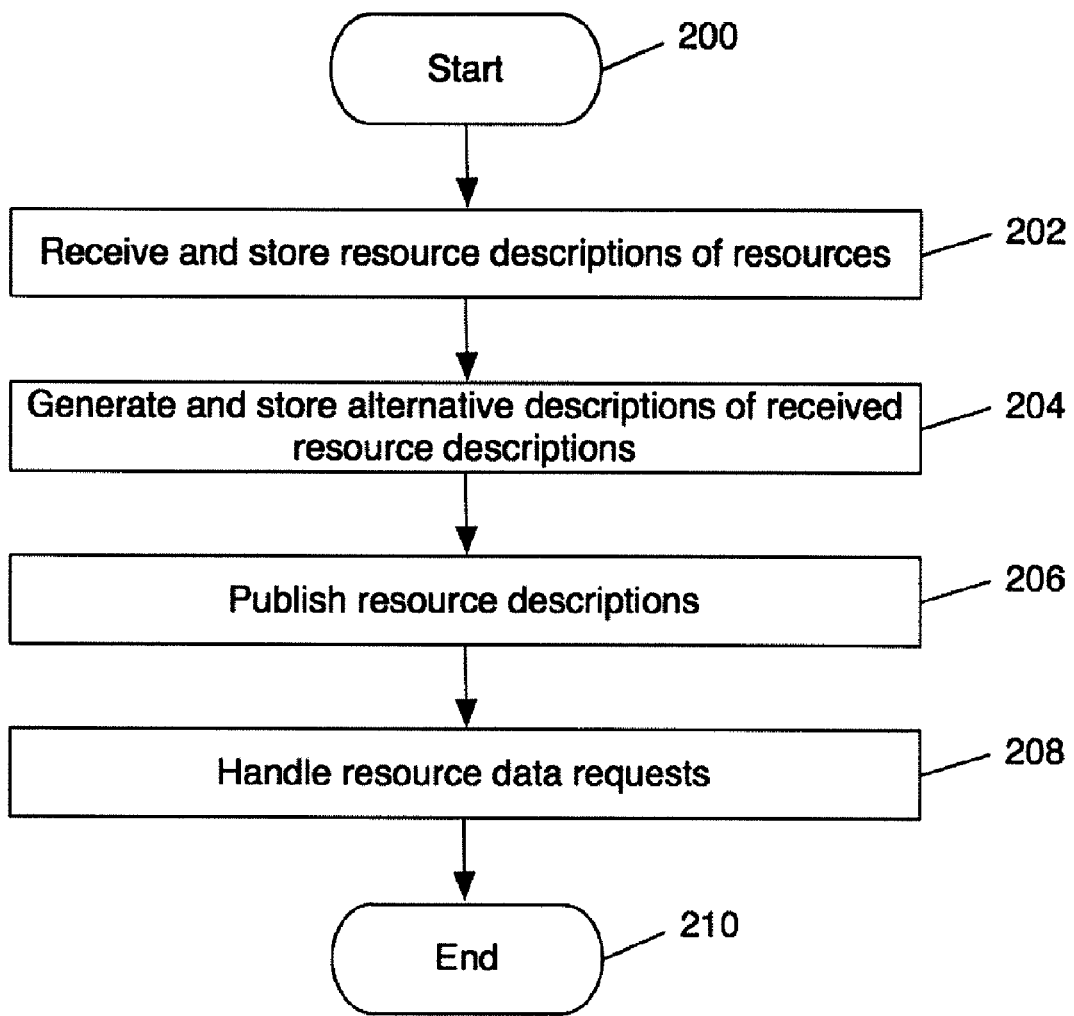
FIG. 2 is a flowchart illustrating an embodiment of the invention.

FIG. 2 illustrates an embodiment of the invention. The embodiment starts in step 200. In step 202, an apparatus receives and stores resource descriptions of a number of resources operatively connected to the apparatus. The apparatus may be connected to a wireless sensor network comprising a set of sensor devices (or embedded devices in general) and a sensor device may be associated with at least one resource. The apparatus may be realized with a router or an intermediate node 106, which may physically be either a wireless router between the low-power wireless network and the Internet/Intranet or an edge server in the Internet/Intranet. The resource descriptions comprise resource identification information. The resource identification information may comprise at least one of the following: a resource interface, the location of the resource interface, the location of the interface specification, a unique resource identifier (ID), and resource properties. The resource properties may comprise information on the sensor types available with the sensor device, how often the sensor may be read, and whether the sensor data is cacheable, for example. In an embodiment, the resource descriptions are received from the sensor devices. In addition, the descriptions may be stored in the apparatus manually or they may be pre-configured in the memory of the apparatus.

In step 204, the router generates and stores alternative descriptions of received resource descriptions by changing at least part of the identification information of the descriptions. In the generation of the alternative descriptions, the apparatus may change the resource interface of the resource description to the interface of the apparatus. In addition, the apparatus may change the required protocol of the resource interface of a received resource description to one of the protocols supported by the apparatus. For example, a resource description may indicate that a resource is using a binary SOAP protocol for communication. The router may generate alternate descriptions where the protocol used is changed to SOAP or SIP, for example. These conversions will be described later.

In step 206, the router publishes at least some of the resource descriptions in a network. By publishing or advertising the resource descriptions the router makes the resources available to the users, computers and servers accessing the Internet/Intranet the router is connected to. The servers of the network may wish to access the information provided by the resources. The servers inform their need for the information by sending a resource data request to the address defined in the resource description. In an embodiment, the router has defined itself as the receiver of the data requests in the published resource descriptions.

In step 208, the router is configured to receive and handle data requests relating to the resources. Depending on the resource, the router may respond to a request with a cached data or the router may send the request to the resource in question. The router may also adapt the protocol of the request to the protocol used by the resource. For example, if the router receives a SOAP request (based on an alternative resource description advertising SOAP as the connection protocol) but the resource supports binary SOAP, the router may forward the request to the resource using binary SOAP. Correspondingly, the router will take care of the protocol when forwarding the response from the resource to the requesting server. The embodiment ends in step 210.

Figure 3:
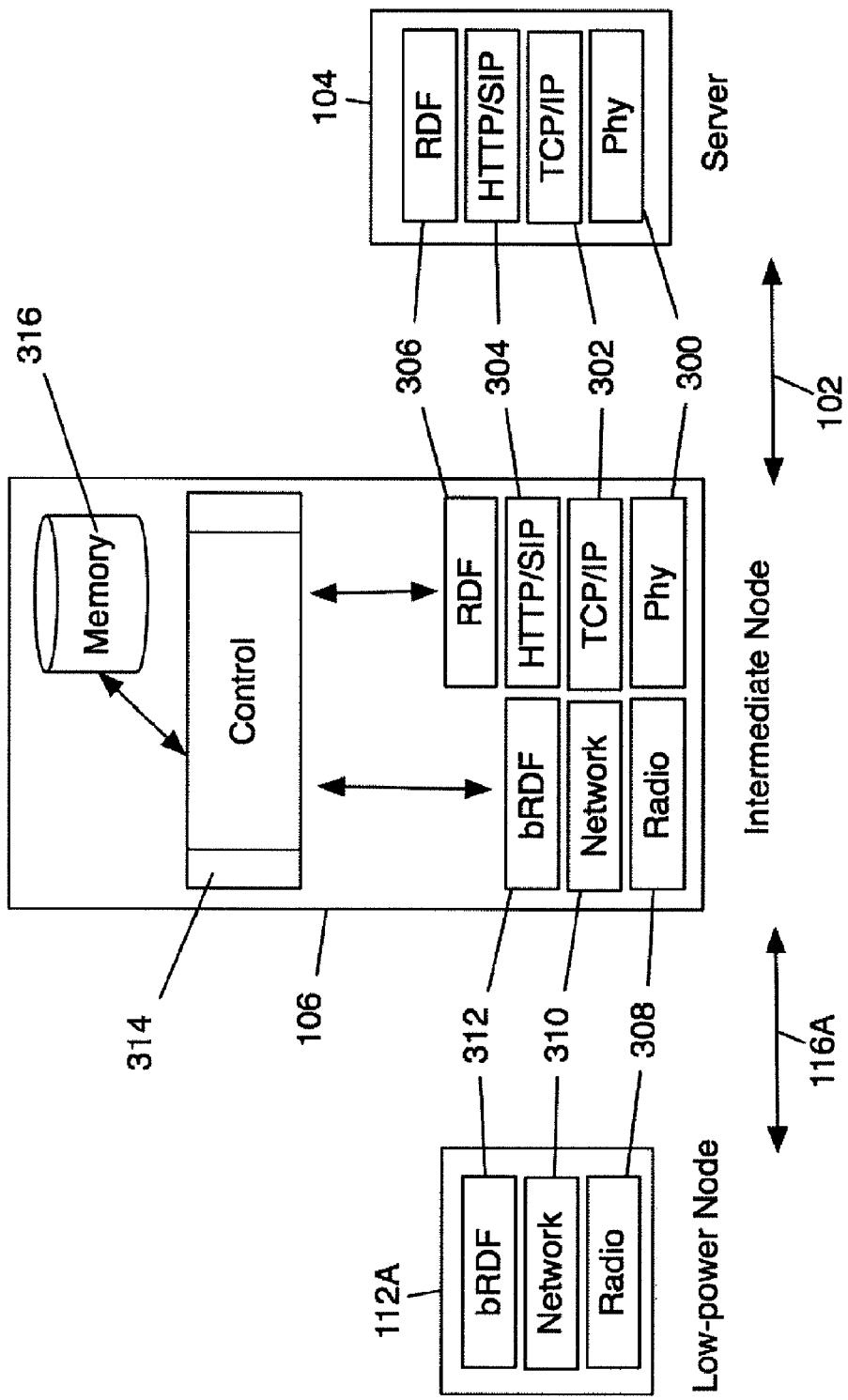
FIG. 3 illustrates protocol stacks in an embodiment of the invention.

FIG. 3 illustrates protocol stacks in an embodiment of the invention. FIG. 3 shows an intermediate node or router 106 connected to a low-power node or a sensor 112A of a low power sensor network via a low power wireless link 116A. The router is further connected to a server 104 via an IP-based network, such as the Internet/Intranet 102.

In the example of FIG. 3, the router 106 is configured to communicate with the IP-based network with the server 104 by using XML encoded RDF messaging and with the low-power nodes by using binary encoded RDF messaging. In XML encoded RDF messaging, the protocol stacks 300, 302 and 304 comprise a physical layer, followed by TCP/IP and HTTP. RDF 306 is transported on top of HTTP by using Request/Response POST or GET. The content of the RDF message is encoded by using XML. HTTP may be replaced with other application protocols, such as SIP.

The binary encoded RDF messaging is a compressed version of the XML encoded messaging. XML tags are replaced with binary equivalents and respective binding. The binary encoded RDF messaging carries all the functionality of the RDF messaging but requires only a very small transmission capacity, thus making it suitable for low-power and low-capacity networks. The transformation of XML encoded RDF not only encodes the XML tags but also takes into account the HTTP and TCP/IP binding. Thus, RDF may be transported over unreliable networks.

In the binary encoded RDF, the protocol stacks 308, 310 and 312 of the low-power nodes and the intermediate node or the router are made up of a radio layer, a networking layer and binary RDF encoding. The network layer depends on the wireless link technology used. The network layer may be based on IPv6 (6lowpan) over IEEE802.15.4 with User Datagram Protocol (UDP), for example. The binary encoded RDF may be run directly over the networking without HTTP. XML encoding is replaced with compact binary encoding. In this case, RDF is bound to a low-power wireless stack by using unreliable transport, such as UDP.

In an embodiment, when transferring messages between low-power node 112 and a server 104 the router is configured to perform RDF encoding transformation between XML based and binary messaging. The router may comprise a processor 314 utilizing a compression/decompression algorithm used in the compression/decompression and a memory 316 for storing a set of lookup tables defining the compression/decompression.

In an embodiment, the set of lookup tables describe how resource descriptions, requests and responses are mapped between the low-power binary messaging and XML-based messaging.

Figure 4:
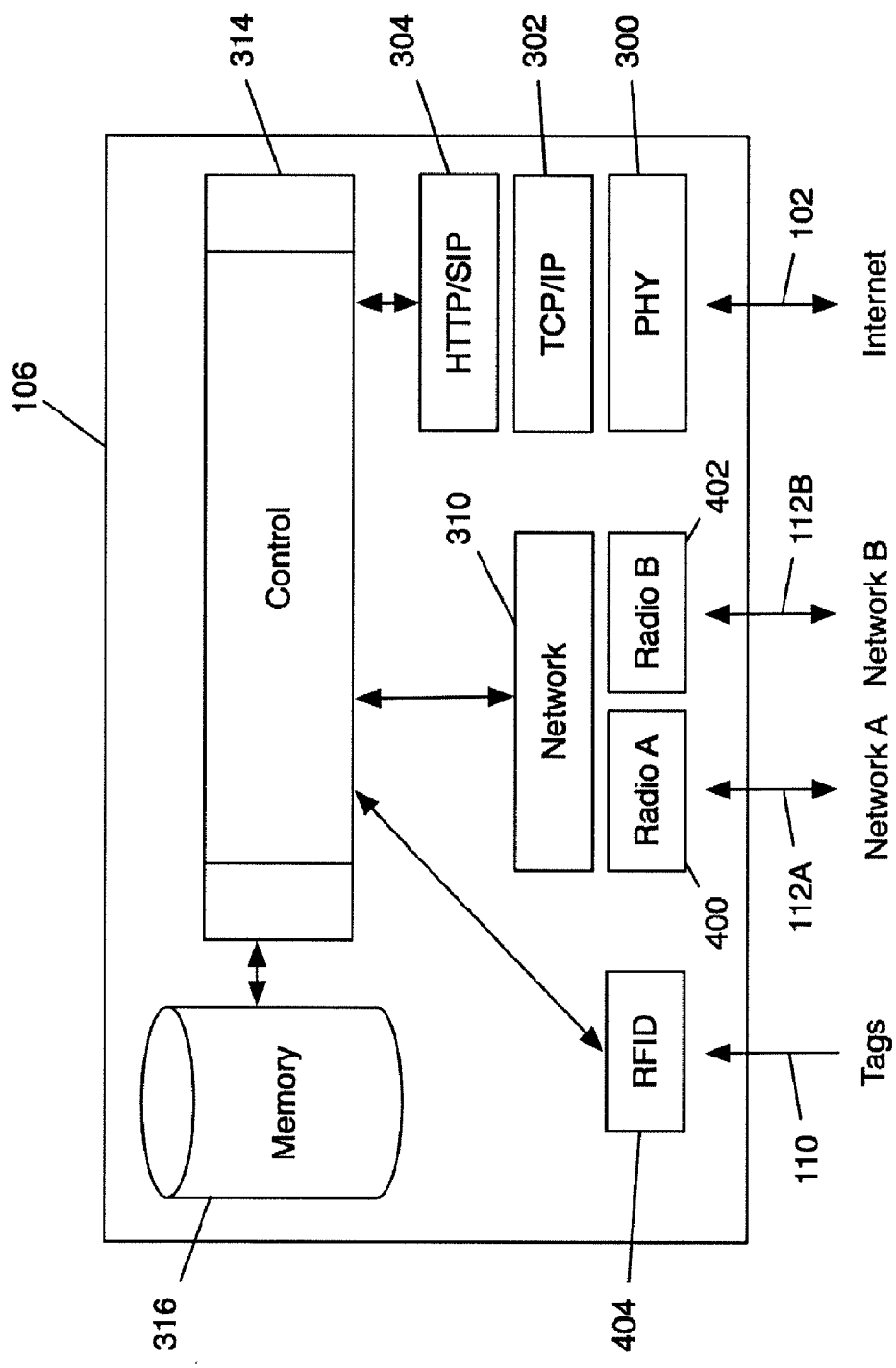
FIG. 4 illustrates an example of an intermediate node or router.

FIG. 4 illustrates an example of an intermediate node or a router 106. The router comprises a processor 314 with associated software required for performing the necessary tasks of the router. The router further comprises a memory for storing different information required in the operation of the router. The memory may be realized with one or more memory circuits, components, hard discs or any other storage devices known in the art. The memory may also be an external memory. In addition, the router comprises one or more communication interfaces or layers, such as an interface layer for the physical layer 300 and related stacks 302, 304 for communicating with IP-based networks, a network layer 310 for communicating with a set of low-power radio interfaces 400, 402. In the example of FIG. 4, the router comprises two radio interfaces 400, 402 for communication with two low-power networks utilizing different radio interface. For example, interface 400 may support IEEE 802.15.4, with Internet Protocol v6 (6lowpan), and interface 402 may support IEEE 802.15.4 with ZigBee, for example. In addition, the router may comprise an interface 404 for other communication techniques, such as RFID tags.

In an embodiment, Resource Description Framework RDF is utilized in resource descriptions. Other resource languages may be used as well, but below RDF is used as an example. RDF is usually based on XML, so basic XML terms such as namespaces apply to RDF as well.

In RDF, statements are used to describe properties of resources. Statements may utilize Uniform Resource Identifiers (URI) to describe resource properties. An example of a URI is a Web address (Uniform Resource Locator, URL). Each RDF statement comprises a subject, which defines the subject of the description. In an embodiment, this is a URI pointing to the interface to the resource. A RDF statement further comprises a predicate, which indicates the type, the property or characteristic of the subject. In an embodiment, this is an abstract URI from the default RDF namespace or a custom namespace. In addition, a RDF statement further comprises an object, which identifies the value of the description, and can be of any datatype (indicated by rdf:datatype attribute in RDF/XML).

RDF descriptions are usually structured as an array of predicate+object pairs about a particular subject. In RDF/XML those pairs are contained within an rdf:Description tag. There can be several descriptions (different objects) in a single RDF message.

Resource descriptions for sensor network nodes may include an RDF entry with the URI of the resource itself and a pointer to its description, followed by an array of properties for that resource. In some cases, a universal ID for the description is included. For example:

```
POST /register HTTP/1.1
Host: router.com
Content-Type: application/rdf+xml; charset=utf-8
Content-Length: nnn
<?xml version="1.0"?>
<rdf:RDF xmlns:rdf=http://www.w3.org/1999/02/22-rdf-syntax-ns#
xmlns:exterms="http://www.sensormanufacturer.com/terms/">
    <rdf:Description df:about="bsoap://sensor12.com">
    <exterms:resourcedesc>http://www.sensormanufacturer.com/temp
237A.wsdl</exterms:resourcedesc>
    <exterms:uuid>3s34sa</exterms:uuid>
    <exterms:period rdf:datatype="&xsd;int">255</exterms:period>
    </rdf:Description>
</rdf:RDF>
```

The above example clip of RDF/XML is a description for a resource. The XML attribute drf:about inside the rdf:Description XML tag indicates that the resource is available at the URI bsoap://sensor12.com and that the protocol used is binary SOAP.

The section exterms:resourcedesc indicates that the resource has a Web Services Description Language (WSDL) description available at http://www.sensormanufacturer.com/temp237A.wsdl. The section exterms:uuid indicates that the resource has a universal ID 3s34sa and section exterms:period that the update period of the resource is 255 seconds. Other information such as the type of the sensor, and its cacheability could also be included but are nor shown in this example.

The first two lines of the above description indicate that the example clip is an HTTP POST message and that the description is being sent to http://router.com/register.

Figure 5:
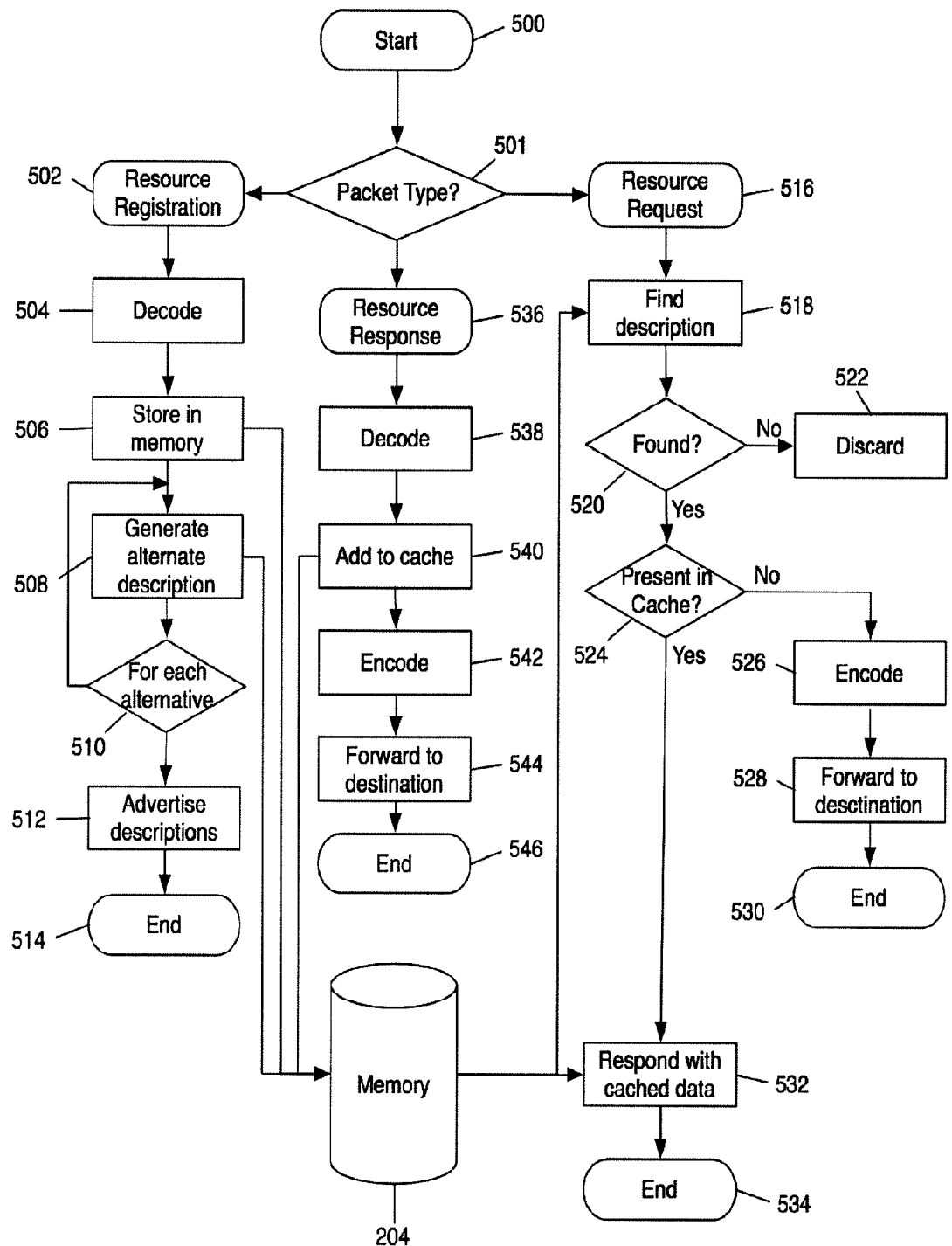
FIG. 5 is a flowchart illustrating embodiments of the invention.

FIG. 5 is a flowchart illustrating an embodiment of the invention. FIG. 5 shows some aspects of the operation of the intermediate node or router.

The operation starts in 500 by the reception of a communication.

In step 501, the type of the communication is examined. In this example, the communication may be one of the following types: a resource registration, a resource request or a resource request response. Other communication types may also exist but they are not described here for the sake of simplicity.

If the communication is a resource registration comprising a resource description received from a sensor or a low power node, the operation continues in 502.

In step 504, the resource description is decoded. The registration may have been sent using any of the protocols supported by the router.

In step 506, the resource description is stored in the memory 316 of the router.

In step 508, an alternative resource description is generated.

In step 510, it is checked if more alternative descriptions can be generated. For example, it may be possible to generate a description matching each protocol the router supports (SOAP, SIP, etc). If so, the process returns to step 508.

If not, the process continues in step 512 where at least part of the resource descriptions are advertised in the Internet/Intranet. On the basis of the advertisement, the servers or clients in the Internet/Intranet may access the resource. The router may advertise both the original resource description and the generated alternative descriptions. In an embodiment, the router advertises only the generated alternative descriptions. This may be the case when the protocol supported by the resource is not used in the Internet/Intranet.

The process ends in step 514 after the descriptions are advertised.

Referring to FIG. 4, the advertising may be performed by sending the resource descriptions to each server connected to the router via the Internet/Intranet 102. In addition, the router may store the resource descriptions in an RFID interface 404 whereby a mobile device may read the available resources when entering the physical area served by the resources advertised by the router. In addition, the router may send the descriptions to other networks connected to the router. For example, the router may advertise the resources of a network communicating through a radio interface 400 to the network communicating through a radio interface 402. In this way, networks utilizing different radio interfaces may use each other's resources. For example, a mobile device comprising an ultra low power Bluetooth connection to the router may communicate with a resource having a ZigBee connection with the router.

Referring again to FIG. 5, if the type of communication is found to be a resource request, in step 502, the operation continues in step 516.

In step 518, a resource description matching the request is searched from the memory 316.

In step 520, it is checked whether a matching resource description was found. If not, the communication is discarded in step 522 and the process ends.

If a matching resource description was found, it is checked in step 524 whether valid data corresponding to the request is cached in the memory 316.

If not, the request is encoded in step 526 using the protocol indicated by the original resource description and forwarded to the destination in step 528 The destination is the low power node or sensor whose address is indicated in the resource description. Typically, it is a low power node or a sensor which sent the resource description.

The process ends in step 530 after the request has been forwarded.

If in step 524 valid data corresponding to the request was found to be cached in the memory 316, the request may be answered directly without forwarding the request to destination. In such a case, the data is read from the memory 316 and a response comprising the data is sent to the sender of the request in step 532.

The process ends in step 534 after forwarding the request.

If the type of communication is found to be a resource request response, in step 502, the operation continues in step 536.

In step 538, the resource description is decoded. The response may have been sent using any of the protocols supported by the router.

In step 540, the data of the resource request response is added to the cache in the memory 316 if the resource description of the sender of the response indicates that the data is cacheable. If the data is not cacheable, this step is not performed.

In step 542, the response is encoded using the protocol indicated in the resource request to which the communication is a response.

In step 544, the response is forwarded to the destination. The destination may be the originator of the resource request.

The process ends in step 546 after forwarding the response.

In an embodiment, the intermediate unit, the network unit or the router 106 may compress the XML-based protocols used in the Internet/Intranet into a binary format protocol comprising the same message elements in a binary format, as mentioned above. Respectively, the router 106 may decompress binary format messages into XML-based protocols. These conversions will be described below.

In an embodiment, the unit configured to perform compression/decompression between XML and binary messaging comprises a processor 314 utilizing a compression/decompression algorithm used in the transformation, and a memory 316 for storing a set of lookup tables utilized in the compression/decompression.

As already mentioned, in an embodiment Resource Description Framework (RDF) or a similar Internet resource description language may be used in resource descriptions to describe properties of the resources. Resource data requests and responses may be transmitted using SOAP, SIP, HTTP or any other suitable protocol. Both resource description and request/response transmission may be compressed/decompressed between binary and XML-based formats.

Both the resource description messages and the data request/response messages comprise a header and a body. In an embodiment, the header structure in both message types is similar.

In an embodiment, the version number is encoded in the first byte of the message together with the Multipurpose Internet Mail Extensions (MIME) format of the message. Common MIME examples include SOAP+XML, RDF, Atom+XML etc. This way the processor decoding the message can differentiate between a binary SOAP message or a binary RDF message. It is also extensible to other MIME types. A three-byte binary {tag, datatype, value}—triple describing the Uniform Resource Identifier of the destination of the message is encoded after the version byte. Triples are utilized in the encoding of the header of the message. The header may comprise other information such as the XML namespace used in the message.

In an embodiment, Uniform Resource Identifiers (URI) are utilized in the headers. The compression and decompression of RDF messages may comprise the compression and decompression of URIs.

In an embodiment, URIs are compressed by representing them with triples {tag, datatype, value}, which are represented by 3 bytes. The first part of the URI is represented by the tag and the tag may be read from a lookup table. The second part of the URI is represented either by some datatype and a value, or by another lookup table entry.

As an example, consider the following example URI:
http://www.router.com/sensor/126

When this URI is describes as a {tag, datatype, value} triple, the tag is of the form: {0xa1, 0x01, 126} where the value "0xa1" defines an entry "http://www.router.com/sensor/" in the lookup table.

The second number 0x01 is a datatype entry, which is of the following form:

The entry "0x01" indicates the datatype of the last entry of the triple as an 8-bit hexadecimal number.

The last entry 126 of the tripe is the value.

Thus, the value is 126, which, as indicated by the datatype entry, is an integer.

This way, the most common URIs used for these types of resource descriptions may be compressed into 3 bytes. All URIs can be encoded in the above manner. However, if the tag part is not in the lookup table, the decoding takes more than 3 bytes.

Consider another example where both parts of the URI are stored in a lookup table. The URI is of the form sip://www.mysensor.com/temp This URI could be compressed into a triple of the following form:

{0x0b1, 0x08, 0xb2}, where
value 0x0b1 refers to a lookup table entry comprising "sip://", value 0x08 is a tag lookup code and value, 0xb2 refers to a lookup table entry comprising "www.mysensor.com/temp".

In these two examples the URI tag lookup table would be:

| Code | Element |
|------|---------|
| 0xa1 | http://www.router.com/sensor/ |
| 0xb1 | sip:// |
| 0xb2 | www.mysensor.com/temp |

Such a lookup table may also have special default codes for things like the IP address of the sender of the message, the IP address of the recipient of the message etc., which both the sender and receiver know explicitly.

Let us first study the compression/decompression between XML and binary messaging regarding resource data requests and responses. As an example of possible conversions, a SOAP into binary SOAP conversion is presented. Here, SOAP is transmitted over HTTP.

In an embodiment, the set of lookup tables describe how a particular binding (SOAP/HTTP e.g.) maps to the low-power binary SOAP binding. The lookup tables tell which transport methods of the bindings correspond to each other. This describes how reliability is dealt with and which compression technique is used to transform the SOAP header and body.

Figure 6:
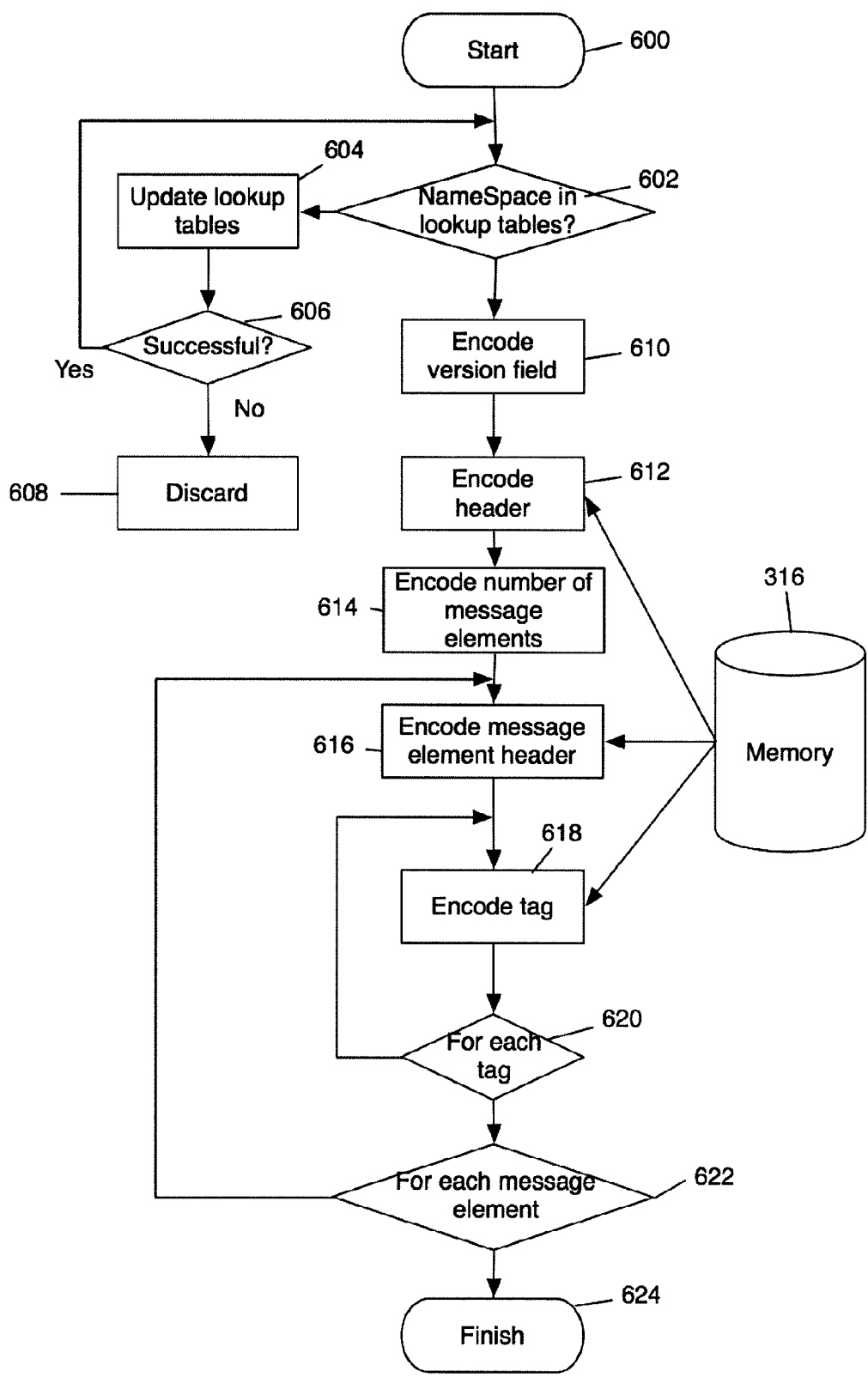
FIG. 6 is a flowchart illustrating an example of the compression of an XML-message.

FIG. 6 is a flowchart illustrating an embodiment of the conversion. Here, HTTP is used as an example of an application protocol.

The process starts at 600 when a full SOAP message encoded with XML and destined to a low-power binary node is received at the router or intermediate node 106. The message may be a resource data request. In this example, it is assumed that the resource data is not cached in the memory 316 but the message must be forwarded to the sensor node. The router performs the transformation of the XML encoding into binary encoding. It is assumed that the SOAP/XML has been checked for correctness.

In step 602, the namespace of the message is detected from the message and checked against namespaces available in the lookup table in the memory 316 of the intermediate node.

If the namespace of the message was not found in the lookup tables in the memory 316, the router may request it from a network server on demand in step 604. The namespace lookup tables can be updated remotely. If a lookup table update was deemed to be successful in step 606, the process starts again from step 602. If a lookup table update was not successful, the message cannot be processed and it must be discarded in step 608.

If the namespace is available, processing continues in step 610.

In step 610, the version number of the encoding and the namespace used are encoded into the binary SOAP message. Typically, the encoding of the version field takes one byte.

In step 612, the header of the binary SOAP message is encoded as described earlier. The encoding may be partly based on the header of the XML encoded message. SOAP header processing rules may be encoded into the binary header. In addition, the binary header comprises transport related information enabling the transport of the message over unreliable networks where HTTP and TCP/IP methods are not available.

In an embodiment, the HTTP packet type and response code (request, response and code, ack, put etc.) are encoded into the binary header. The TCP/IP reliability may be replaced with an Acknowledgement field in the binary header. The Acknowledgement field indicates whether the recipient of the message should send an acknowledgement to the originator of the message after receiving the message.

The first byte of the header describes the number of headers. The rest of the header is encoded as {header type, value} tuples. Thus, each header tag is encoded using two bytes. The header type code and value options are contained in lookup tables. Other header types can be defined as required for the binding.

In step 614, the number of message elements in the SOAP message is encoded after the header tuples. In an embodiment, the number of message elements is encoded as a byte.

Next the message elements of the SOAP message are encoded one by one.

In step 616, the number of tags within the message element and the length in bytes of the message element are encoded based on the lookup table in the memory 316. In an embodiment, the number of tags within the message element is encoded as a byte and the length in bytes of the message element is encoded as a byte.

In step 618, a tag of the message element is encoded using an appropriate tuple {tag code, data type, value}. In an embodiment, the encoding of the tag code and the data type takes a byte each. The encoding of the value varies depending on the data type and the value of the tag.

This is repeated 620 for each tag of the message element.

Tags are nested using an array data type with the value of the number of elements in the array. Tag endings are not used, thus saving space. As explicit length fields are used in this binary byte encoding, it is easy to parse while still being compact. A data type table is used to convert standard SOAP data types into binary encoded data types. The most efficient data types are chosen. For example, there can be five different binary types of the XML integer type. Each binary type is represented by a one byte code in the lookup table.

A complicated XML encoded tag and the value of the tag can usually be compressed down to 3-5 bytes in binary encoding. For example, the following XML tag consumes 41 bytes.

<MeasurementValue>56</MeasurementValue>

It should be noted that in XML, the value 56 is represented by a character string. In the transformation, this is automatically compressed to the smallest number format, in this case an 8-bit unsigned integer. Using the described binary encoding, the above XML tag would be encoded as the following 3 bytes:

| | |
|---|---|
| 0xa5 | // The code of the tag from a lookup table |
| 0x01 | // The data type, in this case an 8-bit unsigned integer |
| 56 | // The value of the tag |

Everything after "//" on each line is a comment. Thus, a 41-byte XML tag may be encoded into a 3-byte binary tag. The actual binary values in the above encoding are provided merely as an example of possible values.

The above steps 616 to 620 are repeated 622 for each message element the SOAP message comprises.

When all message elements have been encoded, the transformation process ends in step 624. When the transformation of the XML format message into a binary format message is complete, the message may be transmitted over the low-power network protocol specified in the compression mapping. For example, this binary SOAP message could be transmitted inside UDP with IPv6 (6lowpan) over IEEE802.15.4 and an IEEE 802.15.4 radio.

In the opposite transform direction, the process is reversed. The lookup table in the memory 316 of the message namespace is utilized to reconstruct the full XML/SOAP message along with the binding mapping to the selected application protocol, such as HTTP or SIP. Thus, the binary header comprising the application protocol packet type and the response code are transformed into an actual application protocol packet with the correct packet type and response code.

Let us next study the compression/decompression of resource descriptions.

In an embodiment, the RDF compression has some similarities to the binary SOAP/SOAP transformation described above. However, some special features of RDF must be taken into account in the body.

In an embodiment, RDF statements may utilize Uniform Resource Identifiers (URI) to describe resource properties. In an embodiment, the compression and decompression of RDF messages comprises the compression and decompression of URIs.

In the RDF encoding, each resource description is an RDF message. Thus, the number of messages is equivalent to the number of descriptions. The number of descriptions included in an RDF transmission is included in the header of the transmission. Following the number of descriptions, the number of tags in the description, length of the description and the URI object triple encoding of the description (rdf:about=) are encoded. Next, the tags of the description are nested as in binary SOAP encoding. The following clip illustrates an example of the encoding the structure:

```
[1] Version + Namespace + MIME type
[3+] URI triple
[1] Number of headers (N)
  For each N:
    [3+] Header triples
[1] Number of descriptions (D)
  For each D:
    [1] Number of tags (T)
    [1] Length of description
    [3+] URI of object (rdf:about)
      For each T:
        [3+] Tag triple for each predicate+subject pair
```

Above, an example of an RDF encoded resource description for a resource available at the URI bsoap://sensor12.com was presented. An exemplary lookup table for the compression encoding of the described resource description could be as follows:

| Code | Element |
|---|---|
| 0xa0 | bsoap:// |
| 0xa1 | http:// |
| 0xa2 | sensor12.com |
| 0xa3 | www.sensormanufacturer.com/temp237A.wsdl |
| 0xa4 | exterms:resourcedesc |
| 0xa5 | exterms:uuid |
| 0xa6 | exterms:period |
| 0xa7 | /register |
| 0xa8 | brdf://router.com |

In an embodiment, the binary representation of the resource description could be as follows:

```
// Header
0x03 // Version, namespace and MIME type (rdf+xml)
0xa8 // Destination URI triple (brdf://router.com/register)
0x10 // Element lookup datatype
0xa7
0x01 // Number of headers
0x01 // Header triple, code for message type
0x10 // Element lookup datatype
0x00 // Request type, equivalent to HTTP POST
// Body
0x01 // 1 description
0x03 // 3 tags
0x18 // Length of description
0xa0 // URI triple (bsoap://sensor12.com)
0x10 // Element lookup datatype
0xa2
// Description tags start
0xa4 // Tag triple (exterms:resourcedesc)
0x11 // URI triple datatype
0xa1 // URI triple (http://
www.sensormanufacturer.com/temp237A.wsdl)
0x10 // Element lookup datatype
0xa3
0xa5 // Tag triple (exterms:uuid)
0x05 // String datatype
0x06 // String length = 6
'3'
's'
'3'
'4'
's'
'a'
0xa6 // Tag triple (exterms:period)
0x01 // Integer datatype (8-bit unsigned)
255
```

Everything after "//" on each line is a comment. The total length of the example encoding is 32 bytes, compared with 521 bytes in the RDF/XML equivalent. Thus, a remarkable reduction in the size of the description is achieved.

Next, let us study an embodiment in more detail. In an embodiment, the resource virtualization performed by the router or intermediate node 106 may comprise three aspects: First, gathering resource descriptions. Second, generating and storing virtual descriptions, and finally caching and handling resource data and requests.

In an embodiment, the sensor node resources may be described in such a manner that the following abstract information is included in the description: the location of the resource interface (as a URI), the location of the interface specification (as a URI), a unique resource identifier (UUID), and other properties of the resource. These properties may comprise sensor types available to the sensor device, how often the sensor may be read, and whether the sensor data is cacheable, for example.

As mentioned, one way to describe such a resource is to use the Resource Description Format (RDF) or the binary encoded version thereof as described above. Other similar descriptions and formats such as ATOM or plain XML, both in compressed and uncompressed forms may be utilized as well. The following description assumes the binary RDF format.

Referring to FIG. 3, resource descriptions are acquired by the router or the intermediate node 106 from low-power nodes 112A, 112B, handled by the control logic 314 of the router and stored in the memory 316. In an embodiment, the low power nodes send resource descriptions to a well-known URL on the intermediate node such as http://router.com/reg-ister, for example. In an embodiment, the router or intermediate node is configured to request resource descriptions from low-power nodes by sending a request message to a well-known URL, thus generating a response with the description.

Figure 7:
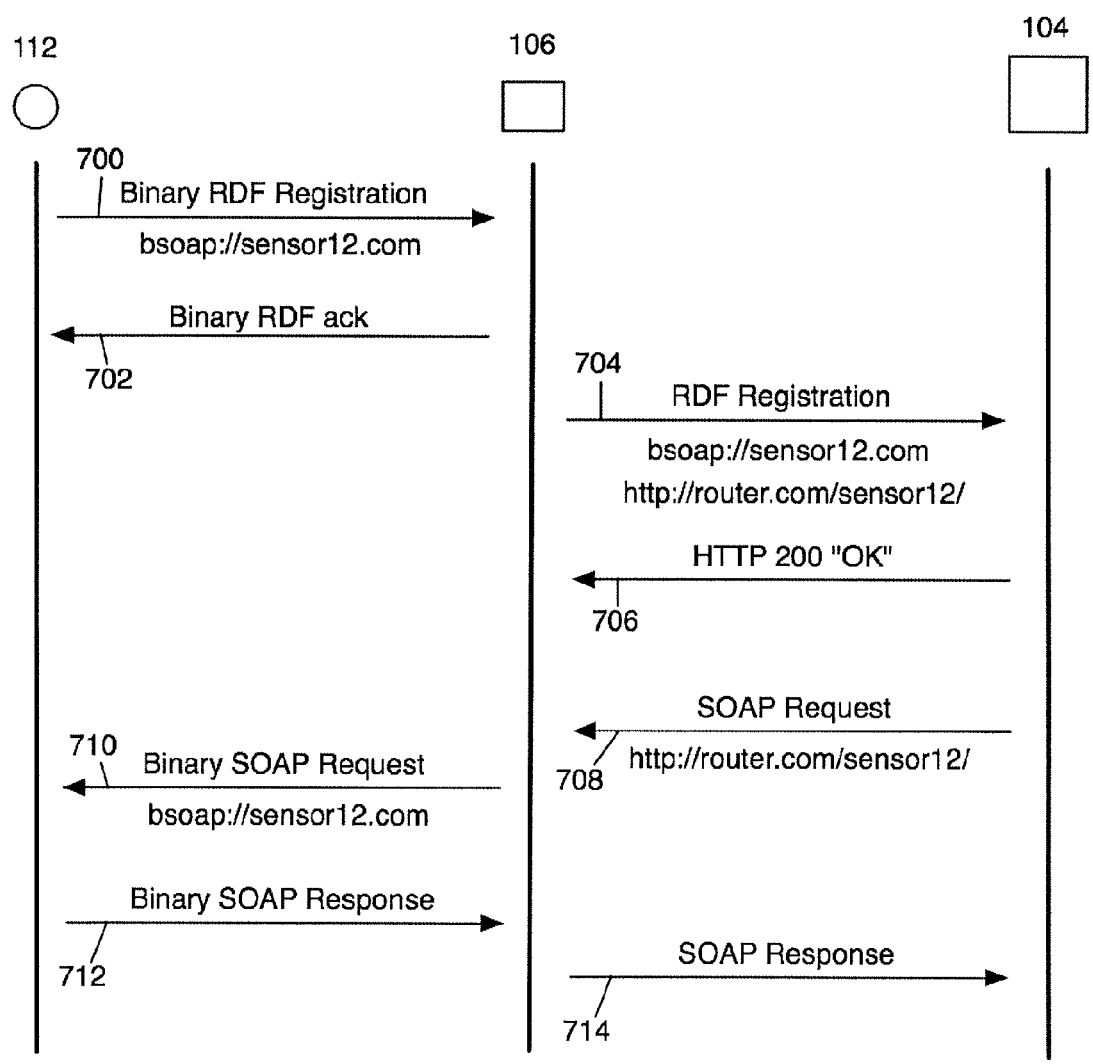
FIG. 7 illustrates an example of the exchange of messages.

FIG. 7 illustrates an example of an embodiment, where a description in binary RDF 700 is being sent from a server node 112A to the router or intermediate node 106, which responds with an acknowledgement 702. In an embodiment, descriptions may be gathered from RFID tags 108 or from the Internet.

Once a resource description is acquired, resource virtualization is performed. Alternative versions of the resource description are generated. For example, the URI of the resource interface may be changed to that of the intermediate node and protocols it supports. For example the original interface URI bsoap://sensor12.com could be generated into a standard SOAP HTTP resource description pointing to the router or intermediate node 106. Other alternative protocols may also be advertised such as SIP. The intermediate node performs proxying of those protocols to the native resource interface. If caching is allowed for the resource, that may also be performed. For example, following alternative protocol changes may be made:

bsoap://sensor12.com←http://router.com/sensor12
bsoap://sensor12.com←sip://router.com/sensor12

In an embodiment, the original resource description and all alternative resource descriptions may be stored in a memory 316. All resources may be related by the unique ID of the resource. The router or intermediate node 106 may advertise these resource descriptions elsewhere, e.g. to a server 104. In FIG. 7, the router sends an RDF registration message 704 to the server 104. The message identifies the resource, the protocol used and the URI where the resource may be contacted. The server may reply with an acknowledgement message 706. The router may send several messages, one message for each alternative description. Thus, the server 104 may select the protocol to use when it needs to acquire data from the resource.

The router or intermediate node 106 is now ready for handling requests. In an embodiment, if a resource is marked as cacheable, the intermediate node may choose to periodically request resource data and save it in memory 316. This shields the low-power network from potentially large numbers of requests from the Internet, and saves power.

When the router or the intermediate node receives a resource data request from for example a server 104, there are several options available. For example, a direct request may be forwarded to a low-power node, a request for a cached resource may be made, or a request for a non-cached resource. If the original description was advertised to the server, it may directly access the resource using the URI of the description if the protocol of the description is supported on the server. In this case, the router or intermediate node 106 simply routes the request to the node without processing. If the request is based on a virtual resource URI of an alternative description, the router or intermediate node 106 may either answer immediately on behalf of the low-power node with cached data, or proxy the request to the low-power node.

The proxying case is illustrated in FIG. 7. A server 104 sends a request 708 using the SOAP protocol. The router or intermediate node 106 encodes the request to a binary format and forwards the request 710 to the low-power node 112A. The node sends a binary SOAP response 712 to the router or the intermediate node. The router or the intermediate node 106 decodes the response, may cache it, and encodes the response using SOAP and forwards 714 it to the server 104. In FIG. 7, bsoap and SOAP are used as examples of possible protocols. Other corresponding protocols may be used as well as one skilled in the art is well aware.

The intermediate node or router 106 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of the microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The node is configured to be in connection with the low-power wireless network and the Internet/Intranet with suitable interfaces. The interfaces may be either wired or wireless. The node comprises a processing unit configured to perform the processes described in connection with FIGS. 1 to 7. The node may comprise a memory 316 for storing a set of lookup tables and other data. In an embodiment, the lookup tables are stored in another device connected to the intermediate node. The processing unit may be configured to request lookup tables from a network server on-demand if required. The node may be a wireless router between the low-power wireless network and the Internet/Intranet or an edge server located in the IP network.

An embodiment provides a computer program embodied in a distribution medium, comprising program instructions which, when loaded into an electronic apparatus, execute a computer process, the process comprising: receiving and storing resource descriptions of a number of resources comprising resource identification information, generating and storing alternative descriptions of received resource descriptions by changing at least part of the identification information of the descriptions, publishing at least some of the resource descriptions in a network, and handling resource data requests from the network relating to the resources.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
at least one processor; and
at least one memory including computer program code,
the at least one memory and computer program code configured to, with the at least one processor, cause the apparatus at least to perform:
storing resource descriptions of a number of resources operatively connected to the apparatus, the resource descriptions comprising a resource interface, a location of the resource interface, a location of an interface specification, a uniform resource identifier, and resource properties,
generating and store alternative descriptions of received resource descriptions by changing the resource interface of the resource description to the interface of the apparatus,
changing a required protocol of the resource interface of a received resource description to a protocol supported by the apparatus,
publishing at least some of the resource descriptions in a network,
handling resource data requests from the network relating to the resources, and
associating a sensor device of a sensor network with at least one resource description,
wherein the apparatus manipulates at least one uniform resource identifier included in the stored resource descriptions without altering the format of the resource descriptions so that the apparatus operates as a resource proxy.

2. The apparatus of claim 1, wherein the apparatus is operatively connected to an embedded network comprising at least one embedded device and wherein an embedded device is associated with at least one resource description.

3. The apparatus of claim 2, further configured to process resource descriptions comprising at least one of the following: sensor types available to the embedded device, how often a sensor may be read, and whether data for the sensor is cacheable.

4. The apparatus of claim 3, configured to cache the resource data of the response received from the embedded device if the resource description indicates data for the sensor is cacheable.

5. The apparatus of claim 2, configured to receive a resource data request from the network using a protocol supported by the apparatus and included in a published resource description associated with a sensor device,
send the request to the embedded device using a using a protocol supported by the embedded device,
receive a response from the embedded device using a using a protocol supported by the embedded device,
send the response to the originator of the resource data request using the protocol of the data request.

6. The apparatus of claim 2, configured to receive a resource data request from the network using a protocol supported by the apparatus and included in a resource description associated with a embedded device,
check whether requested resource data is cached in the apparatus,
and if the resource data is cached send a response with the cached data to the originator of the resource data request using the protocol of the data request,
and if the resource data is not cached send the request to the embedded device using a using a protocol supported by the embedded device,
receive a response from the embedded device using a using a protocol supported by the embedded device,
send the response to the originator of the resource data request using the protocol of the data request.

7. The apparatus of claim 1, configured to periodically read data from a resource, cache the data, and send the cached data as a response to a resource data request received from the network.

8. The apparatus of claim 1, configured to communicate with the resources with binary messages comprising a binary header and binary message elements, the binary message comprising elements corresponding to elements of an Extensible Markup Language (XML) based Internet resource description language format message.

9. The apparatus of claim 8, configured to include, in the binary header, a version number of encoding together with the Multipurpose Internet Mail Extensions (MIME) format of a message,
the namespace used in the message, and
a three byte binary {tag, datatype, value} triple and describing the Uniform Resource Identifier of the destination of the message, wherein at least one byte of the three byte binary triple is selected using a lookup table.

10. The apparatus of claim 8, further configured to indicate the number of message elements of a binary message as a binary number after the binary header of the binary message.

11. The apparatus of claim 10, further configured to
decode each binary message element by
indicating the message element code, number of tags in the message element and the length of the message element and
compressing each tag as tuples comprising a tag code, a data type and a data value.

12. The apparatus of claim 1, wherein the apparatus is configured to receive resource descriptions of a number of resources operatively connected to the apparatus.

13. The apparatus of claim 1, wherein the apparatus is a server of a computer network connected to at least one sensor network via a router.

14. A method for virtualizing resources, comprising
storing resource descriptions of a number of resources comprising a resource interface, a location of the resource interface, a location of an interface specification, a uniform resource identifier, and resource properties,
generating and storing alternative descriptions of received resource descriptions by changing at least the resource interface of the resource description to the interface of an apparatus,
changing a required protocol of the resource interface of a received resource description to a protocol supported by the apparatus,
publishing at least some of the resource descriptions in a network,
handling resource data requests from the network relating to the resources, and
associating a sensor device of a sensor network with at least one resource description,
wherein, as part of the generating alternative descriptions, the apparatus manipulates at least one uniform resource identifier included in the received resource descriptions without altering the format of the resource descriptions so that the apparatus operates as a resource proxy.

15. The method of claim 14, wherein the resource descriptions comprise at least one of the following: sensor types available to the sensor device, how often the sensor may be read, and whether the sensor data is cacheable.

16. The method of claim 15, further comprising caching the resource data of the response received from the sensor device if the resource description indicates the sensor data is cacheable.

17. The method of claim 14, further comprising periodically reading data from a resource, caching the data, and sending the cached data in response to a resource data request received from the network.

18. The method of claim 14, further comprising:
receiving a resource data request from the network using a protocol supported by an apparatus and included in a published resource description associated with a sensor device,
sending the request to the sensor device using a protocol supported by the sensor device,
receiving a response from the sensor device using a protocol supported by the sensor device, and
sending the response to the originator of the resource data request using the protocol of the data request.

19. The method of claim 14, further comprising
receiving a resource data request from the network using a protocol supported by the apparatus and included in a resource description associated with the sensor device,
checking whether the requested resource data is cached in the apparatus,
if the resource data is cached sending a response with the cached data to the originator of the resource data request using the protocol of the data request,
if the resource data is not cached sending the request to the sensor device using a using a protocol supported by the sensor device,
receiving a response from the sensor device using a protocol supported by the sensor device, and
sending the response to the originator of the resource data request using the protocol of the data request.

20. The method of claim 14, further comprising communicating with the resources with binary messages comprising a binary header and binary message elements, the binary message comprising elements corresponding to elements of an Extensible Markup Language (XML) based Internet resource description language format message.

21. The method of claim 20, further comprising including in the binary header the version number of encoding together with the Multipurpose Internet Mail Extensions (MIME) format of a message,
the namespace used in the message, and
a three byte binary {tag, datatype, value} triple and describing the Uniform Resource Identifier of the destination of the message, wherein at least one byte of the three byte binary triple is selected using a lookup table.

22. The method of claim 20, further comprising indicating the number of message elements of a binary message as a binary number after the binary header of the binary message.

23. The method of claim 20, wherein decoding each binary message element comprises:
indicating the message element code, the number of tags in the message element and the length of the message element and
compressing each tag as tuples comprising a tag code, a data type and a data value.

24. The method of claim 14, further comprising receiving resource descriptions of a number of resources comprising resource identification information.

25. A non-transitory computer readable medium including a computer program of instructions which, when loaded into a processor, cause the processor to perform a process comprising:
storing resource descriptions of a number of resources comprising a resource interface, a location of the resource interface, a location of an interface specification, a uniform resource identifier, and resource properties, generating and storing alternative descriptions of received resource descriptions by changing at least the resource interface of the resource description to the interface of an apparatus, changing a required protocol of the resource interface of a received resource description to a protocol supported by the apparatus, publishing at least some of the resource descriptions in a network, handling resource data requests from the network relating to the resources, and associating a sensor device of a sensor network with at least one resource description, wherein the apparatus manipulates at least one uniform resource identifier included in the stored resource descriptions as part of generating the alternative descriptions without altering the format of the resource descriptions so that the apparatus operates as a resource proxy.

26. A non-transitory computer readable medium readable by a computer and encoding a computer program of instructions which, when loaded into a processor, cause the processor to perform a process comprising:

storing resource descriptions of a number of resources comprising a resource interface, a location of the resource interface, a location of an interface specification, a uniform resource identifier, and resource properties, generating and storing alternative descriptions of received resource descriptions by changing at least the resource interface of the resource description to the interface of an apparatus, changing a required protocol of the resource interface of a received resource description a protocol supported by the apparatus, publishing at least some of the resource descriptions in a network, handling resource data requests from the network relating to the resources, and associating a sensor device of a sensor network with at least one resource description, wherein the apparatus manipulates at least one uniform resource identifier included in the stored resource descriptions as part of generating the alternative descriptions without altering the format of the resource descriptions so that the apparatus operates as a resource proxy.

27. The non-transitory computer readable medium of claim 26, the distribution medium including at least one of the following media: a computer readable medium, a program storage medium, a record medium, a computer readable memory, a computer readable software distribution package, and a computer readable compressed software package.

28. An apparatus, comprising:

means for storing resource descriptions of a number of resources operatively connected to the apparatus, the resource descriptions comprising a resource interface, the location of the resource interface, the location of the interface specification, a uniform resource identifier, and resource properties, means for generating and storing alternative descriptions of received resource descriptions by changing at least the resource interface of the resource description to the interface of the apparatus, means for changing a required protocol of the resource interface of a received resource description to one of the protocols supported by the apparatus means for publishing at least some of the resource descriptions in a network, means for handling resource data requests from the network relating to the resources, and means for associating a sensor device of a sensor network with at least one resource description, wherein the apparatus manipulates at least one uniform resource identifier included in the stored resource descriptions as part of generating the alternative descriptions without altering the format of the resource descriptions so that the apparatus operates as a resource proxy.

* * * * *